June 24, 1930. N. P. PALMER ET AL 1,765,697
CALCULATING MACHINE
Filed March 19, 1928 3 Sheets-Sheet 1
Fig. 1.
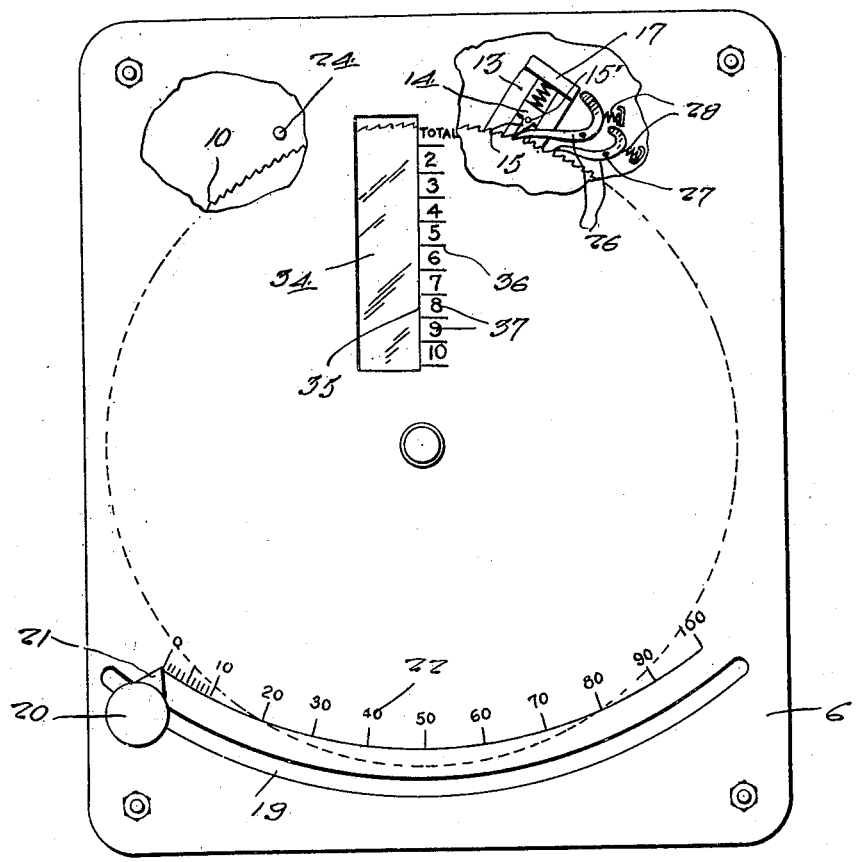
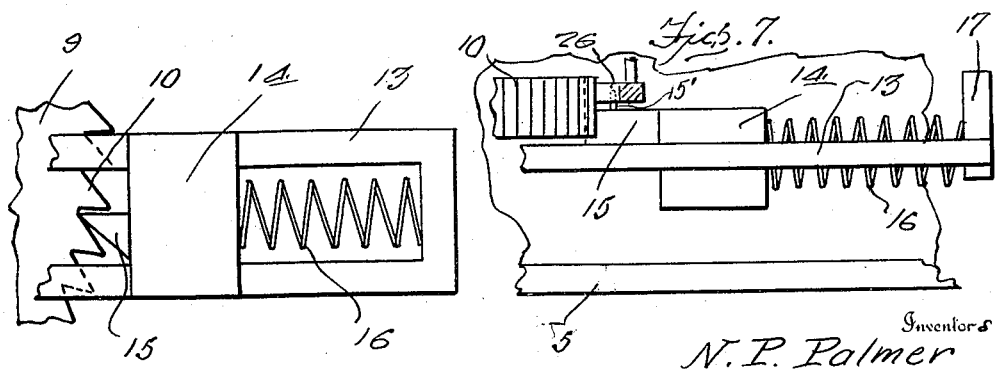
Fig. 6. Fig. 7.
Inventors
N. P. Palmer
W. B. Herron
By Clarence A. O'Brien
Attorney Inventors
N. P. Palmer
W. B. Herron June 24, 1930.  N. P. PALMER ET AL  1,765,697
CALCULATING MACHINE
Filed March 19, 1928   3 Sheets-Sheet 3

Inventors
N. P. Palmer
W. B. Herron
By Clarence A. O'Brien
Attorney

Patented June 24, 1930

1,765,697

UNITED STATES PATENT OFFICE

NELSON P. PALMER AND WILMER B. HERRON, OF BUTLER, PENNSYLVANIA

CALCULATING MACHINE

Application filed March 19, 1928. Serial No. 262,970.

The present invention relates to a calculating machine and has for its principal object to provide a machine by means of which the average of two or more known numbers may be instantly determined.

A further object is to also ascertain the total of the numbers and at the same time determine the average thereof.

More specifically, the invention comprises a rotatably mounted disc having its periphery provided with a series of ratchet teeth and having a scale arranged on its upper surface including a series of concentrically arranged circles, the outermost circle being arranged in a scale having units corresponding in number with the number of the ratchet teeth and the remaining circles having scales arranged in graduations with their units proportioned according to the relationship of the respective inner circles with the outer circle and also providing a disc operating arm for rotating the disc and registering the respective scales with a fixed indicator.

A still further object is to provide a scale cooperating with one end of the disc operating arm for indicating the extent of each movement of the disc by the arm in terms of units equal to the units of the outermost scale of the disc.

An additional object is to provide a calculating machine of this character of a simple and practical construction, which is efficient and reliable in performance, relatively inexpensive to manufacture, and otherwise well adapted for the purpose for which the same is intended.

Other objects and advantages reside in the special construction and combination of the various elements comprising the invention, reference being had to the accompanying drawings, forming a part hereof, wherein:

Figure 1 is a top plan view of the apparatus with parts broken away and shown in section, and illustrating the manner in which the arm engages the disc for the rotation thereof.

Figure 6 is a plan view of the pawl carried at one end of the operating arm for engagement with the ratchet teeth of the disc, and Figure 7 is a view in side elevation thereof.

Figure 2:
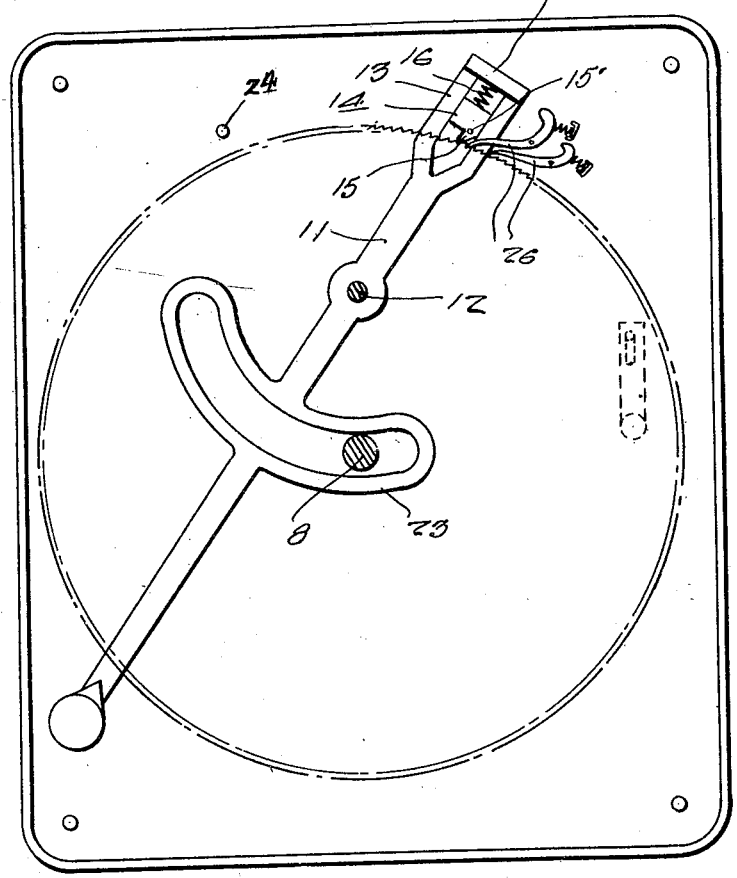
Figure 2 is a similar view, with the cover plate of the device removed and showing the relative position of the disc operating arm with respect to the disc.
Figure 5:
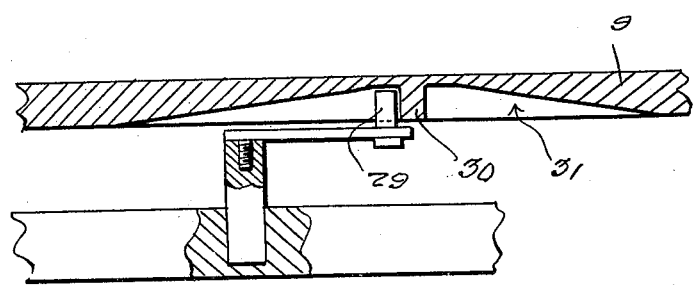
Figure 5 is a fragmentary sectional view of the stop means provided for limiting the rotation of the disc to a single revolution.
Figure 3:
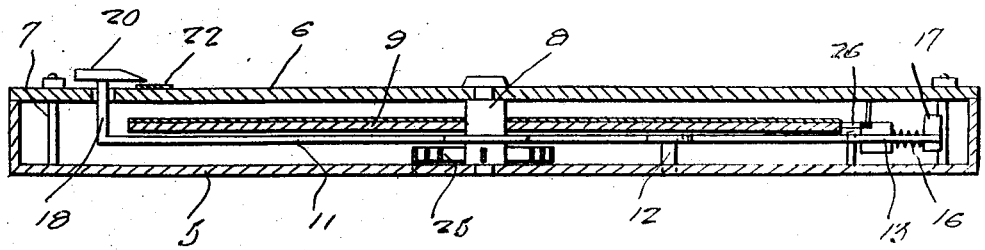
Figure 3 is a vertical sectional view through the housing with the calculating mechanism mounted in operative position therein.
Figure 4:
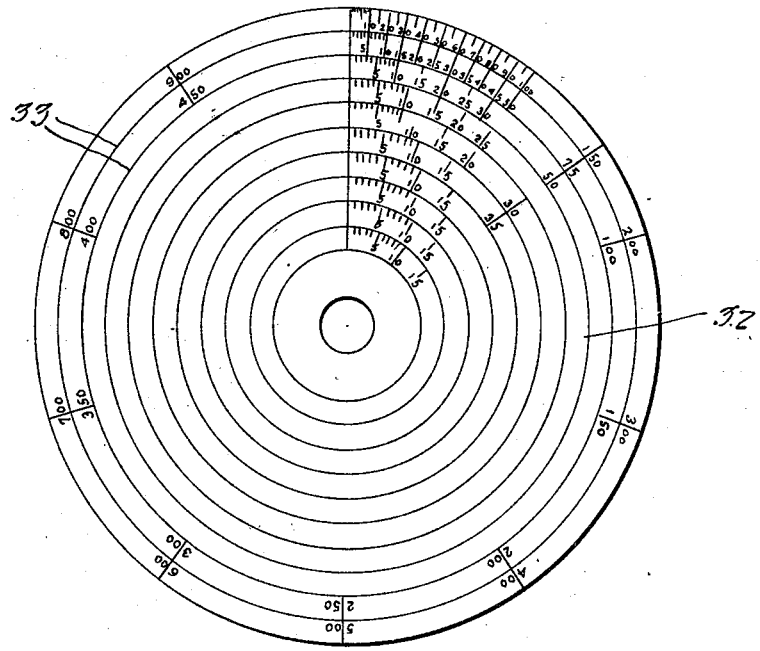
Figure 4 is a plan view of the scale arranged on the upper surface of the disc.

Referring now to the drawing in detail, the invention comprises a relatively shallow housing or container 5, which in the present embodiment of the invention is disclosed as being of a substantially rectangular shape, the same being open at its upper portion and provided with a cover section 6 removably secured in position thereon by bolts 7.

A vertically disposed shaft 8 is rotatably supported at its opposite ends by the base of the housing and cover thereof, said shaft having a disc 9, secured thereto, for rotation therewith, the periphery of the disc being provided with a series of ratchet teeth 10 extending entirely thereabout.

The disc is rotatably operated through an arm 11 disposed beneath the disc and extending diametrically thereof, said arm being pivotally mounted intermediate its ends upon a pivot pin 12 supported by the base of the housing 5. One end of the arm 11 is forked as indicated at 13, between the forked ends thereof being arranged a slidably mounted block 14 having a pawl 15 extending from one end and engageable with the ratchet teeth 10 carried by the disc. At the opposite end of the block 14 is arranged a coil spring 16 retained against an end portion 17 provided at the forked ends of the arms, whereby to yieldably urge the pawl 15 into engaged position with respect to the ratchet teeth.

The opposite end of the arm 11 is formed into a vertical extension 18 extending upwardly through an arcuate slotted opening 19 formed in the cover 6, the outer end of the extension 18 having an operating handle 20, attached thereto. Extending from one side of the handle 20 is an indicating finger 21 mounted for movement with the handle and arranged in indicating relation with a scale 22 carried on the upper surface of the cover 6 of the housing. In order to permit the pivotal movement of the arm 11 without interference with the shaft 8, the portion of the arm 11 adjacent said shaft is provided with a slotted guide 23, extending substantially transversely of the arm, said guide being arranged in an arc disposed in concentric relation with respect to the slotted opening 19, the pin 12 forming a common axis for the same.

The guide 23 is of sufficient length to permit the swinging movement of the arm, permitting the indicating finger 21 to move from end to end over the scale 22, and also to permit the handle 20 to move beyond the end of the scale at one end for a purpose more fully hereinafter described.

A stop pin 24 extends upwardly from the base of the housing 5, in a position for engaging the forked end 13 of the arm, so as to prevent the handle end of the arm from moving beyond the limit of the highest arc of the scale 22.

At the base of the shaft 8 is arranged a coil spring 25, having its opposite ends secured respectively to the shaft and to the bottom of the housing 5, the shaft operating against the tension of the spring upon the rotation thereof in one direction.

A pair of pawls 26 are arranged for engagement with the ratchet teeth 10 of the disc, to normally prevent rotation of the same through the action of the spring 25, said pawls being positioned with respect to the teeth so as to alternately engage the same to prevent the rotation of the disc.

As will be observed from an inspection of Figure 1 of the drawings, one of the pawls is disposed with its tooth engaging end at the outer end of the ratchet teeth while the other pawl is engaging another of said teeth to secure the disc against rotation. In this manner, the pawls 26 cooperate with each other to prevent any possibility of the ratchet teeth slipping past the end of the pawls.

Each of the pawls 26 is pivotally mounted on pins 27 extending downwardly from the cover 6 and have their opposite ends engaged by springs 28, normally urging the tooth engaging ends of the pawl into engaging position. The pawls are disposed in close proximity to the forked end 13 of the arm, and as will be noted from an inspection of Figure 7 of the drawing, the pawl 15 carried by the arm is adapted to engage the lower edge of the ratchet teeth 10, whereas the pawls 26 are disposed at a horizontal plane above the pawl 15 so as to permit the same to engage the upper edge of the teeth without interference with the pawl 15.

Furthermore, as illustrated in Figure 1, the end of the pawl 26 nearest the forked end 13 of the arm is disposed for engagement with the extension 17 on the arm when the indicating finger 21 is pointed, to the zero end of the scale 22. A movement of the handle 20 below the zero points of the scale will operate to move the forked ends 13 of the arm against the pawls 26 so as to release the same from engagement with the ratchet teeth and thus permit the disc to be rotated by the action of the spring 25. Any suitable means may be provided for raising the driving pawl 15, as by a cam on the base 5 or a pin 15' over-lapping one of the pawls 26.

Extending upwardly from the bottom of the housing 5 is a stop 29 mounted on a resilient arm 29', adapted to ride under the lower surface of the disc, said stop being engageable by a lug 30 extending from the under side of the disc, whereby to limit the movement of the disc 9 to slightly less than a single complete rotation. Guide recesses 31 extend in opposite directions from the lug 30 so as to guide the stop 29 into position for engagement with the lug, upon the approach of the lug from either side of the stop.

Upon the upper surface of the disc 9 is arranged a dial 32, secured to the disc in a suitable manner for rotation therewith and of an area equal to the area of the disc. The upper surface of the dial 32 is formed with a series of concentric circles 33, the present embodiment of the invention illustrating a disc provided with a set of ten of such concentric circles. The outermost circle of the dial is divided into units reading in a direction opposite to the scale 22, from one to one thousand, each unit representing one of the ratchet teeth 10 of the disc and disposed in vertical alignment with said teeth. The second inner circle of the dial is marked in units equal to one-half of the number of units of the outer circle, the third inner circle being marked in units equal to one-third of the number of units of the outer circle, the fourth being marked in a ratio of one fourth and each successive remaining circle being similarly marked in accordance with its relationship to the outermost circle.

The cover 6 is provided with a window indicated at 34, having one edge 35 extending radially with respect to the center of the shaft 8, and in radial alignment with the center mark of the scale 22. The surface of the cover 6 immediately adjacent the edge 35 of the window is marked with lines shown at 36, corresponding with the concentric circles 33 of the dial. Each of the lines 36 is identified by a numeral shown at 37, indicating the number of the concentric circle appearing immediately therebeneath.

In the operation of the device, presuming an average of three given numbers is desired, as for example the numbers 72, 28 and 50, the handle 20 is moved across the face of the cover 6, until the indicating finger 21 reaches the unit 72, of the scale 22. It will be apparent that this operation also moves the disc 9 so that the unit 72 of the outermost scale of the dial will appear opposite the edge 35 of the window. The handle 20 is then returned to its zero position, the pawl 15 sliding over the ratchet teeth 10, the pawls 26 serving to secure the same against movement. The handle 20 is then again moved across the surface of the cover until the indicating finger 21 reaches the unit 28 of the scale 22. This second movement of the handle will cause the movement of the disc 9 so that the outermost scale of the dial will be moved an additional number of units, each to the extent of movement of the handle, and accordingly the total of the units of the two movements of the handle will appear opposite the edge 35 of the window. The handle 20 is then returned to its initial position and the third movement of the handle is then made until the indicating finger 21 reaches a position opposite the unit 50 of the scale 22, the outermost scale of the dial will accordingly be again moved an extent equal to the movement of the handle and the sum total of the movements thereof will then appear opposite the edge 35 of the window.

By observing the marking of the dial occurring at the edge 35 of the window, of the third inwardly concentric circle, the average of the three numbers will then be obtained.

In order to reset the dial, the handle 20 is moved outwardly beyond the zero end of the scale 22, whereupon the extension 17 at the opposite end of the arm 11 will release the pawls 26 from the ratchet teeth and permit the spring 25 to return the disc to its original position.

In the present embodiment of the invention it will be understood that the device is limited to obtaining the average of any set of numbers up to ten, it being understood that the sum total of the entire set of numbers cannot exceed one thousand. It is apparent, however, that by making obvious changes, it would permit the average to be obtained of a larger group of numbers.

It is obvious that the invention is susceptible of various changes and modifications, without departing from the spirit or scope of the invention or sacrificing any of its advantages, and we accordingly claim all such forms of the device, to which we are entitled.

Having thus described our invention, what we claim as new is:

1. A calculating device of the character described comprising a spring controlled rotatable disc, means engageable with the disc for rotating the same in one direction against the tension of the control spring, means engageable with the disc for retaining the same against rotation in the opposite direction, the first named means engageable with the last-named means for disengaging said last named means from the disc and allowing the same to be rotated in the opposite direction by the control spring.

2. A calculating device of the character described comprising a spring controlled rotatable disc having a scale thereon, ratchet teeth on the periphery of said disc, means engageable with the ratchet teeth for rotating the disc in one direction against the tension of the spring, means engageable with the ratchet teeth for retaining the disc against rotation in the opposite direction, the first named means engageable with the last named means for disengaging the same from the ratchet teeth and allowing the disc to be rotated in the opposite direction by the spring.

3. A calculating device of the character described, comprising a spring controlled rotatable disc having a scale thereon, ratchet teeth on the periphery of the disc, a pivotally mounted lever associated with the disc, a spring controlled element on the lever engageable with the ratchet teeth for rotating the disc in one direction against the tension of the control spring, means engageable with the disc for retaining the same against rotation in the opposite direction, said means adapted to be engaged by the lever for disengaging said means from the ratchet teeth for allowing the disc to be rotated in the opposite direction by the control spring.

4. A calculating device of the character described comprising a spring controlled rotatable disc having a scale thereon, ratchet teeth on the periphery of the disc, a pivotally mounted lever associated with the disc, a spring controlled element slidably mounted on the lever and engageable with the ratchet teeth for rotating the disc in one direction against the tension of the control spring, spring controlled pivoted pawls engageable with the ratchet teeth for retaining the disc against rotation in the opposite direction, said pawls adapted to be engaged by the lever in a manner to disengage said pawls from the ratchet teeth for allowing the disc to be rotated in the opposite direction by the control spring.

5. A calculating device of the character described comprising a spring controlled rotatable disc having a scale thereon, ratchet teeth on the periphery of the disc, a pivotally mounted lever associated with the disc, a spring controlled element slidably mounted on the lever and engageable with one of the marginal side portions of the ratchet teeth for rotating the disc in one direction against the tension of the control spring, spring controlled pivoted pawls engageable with the other marginal side portions of the ratchet teeth for retaining the disc against rotation in the opposite direction, said pawls adapted to be engaged by the lever for disengaging said pawls from the ratchet teeth for allowing the disc to be rotated in the opposite direction by the control spring.

6. A calculating device of the character described comprising a casing, a spring controlled disc having a scale thereon rotatably mounted in the casing, ratchet teeth on the periphery of the disc, a lever pivotally mounted in the casing and extending beneath the disc, an angularly disposed extension on one end of the lever, means on the opposite end of the lever for swinging the same on its pivot, a spring controlled element slidably mounted on the lever adjacent the extension and engageable with one of the marginal sides of the ratchet teeth for rotating the disc in one direction against tension of the control spring, spring controlled pivoted pawls engageable with the other marginal sides of the ratchet teeth for retaining the disc against rotation in the opposite direction, said pawls adapted to be engaged by the extension on the lever for disengaging the same from the ratchet teeth for allowing the disc to be rotated in the opposite direction by the control spring.

In testimony whereof we affix our signatures.

NELSON P. PALMER.
WILMER B. HERRON.